United States Patent [19]

Textoris

[11] 4,255,610
[45] Mar. 10, 1981

[54] PARTITION WIRING SYSTEM
[75] Inventor: Melvin A. Textoris, Struthers, Ohio
[73] Assignee: GF Business Equipment, Inc., Youngstown, Ohio
[21] Appl. No.: 902,335
[22] Filed: May 3, 1978
[51] Int. Cl.³ .............................................. H02G 3/26
[52] U.S. Cl. ........................................ 174/48; 174/97
[58] Field of Search .................. 174/48, 49, 97, 68 C, 174/70 C, 72 C, 72 A; 138/156; 361/428; 160/135; 52/220, 221

[56] References Cited
U.S. PATENT DOCUMENTS
3,759,297  9/1973  Anderson .......................... 174/48 X FOREIGN PATENT DOCUMENTS
1409853  7/1965  France ........................................ 174/97
1039015  8/1966  United Kingdom ...................... 174/48
1159189  7/1969  United Kingdom ...................... 174/48
1160641  8/1969  United Kingdom ...................... 174/48

OTHER PUBLICATIONS
Mitchell et al., Cable Enclosure, IBM Technical Disclosure Bulletin; May 1970; vol. 12, No. 12, p. 2293.

Primary Examiner—B. A. Reynolds
Assistant Examiner—D. A. Tone
Attorney, Agent, or Firm—Emory L. Groff, Jr.

[57] ABSTRACT

A wiring system for a partition assembly comprises a plurality of horizontally extending elongated wiring channels readily attachable to the outer face of adjacently disposed panels and supporting posts by means of one or more removable hanger assemblies juxtaposed each post. Each hanger assembly including at least one terminal section insertable in the end of an adjacent panel wiring channel and a medial section serving to support a post wiring channel. One or more wiring compartments within all of the wiring channels are longitudinally aligned with one another to provide continuous electrical raceways or compartments from one end of the assembly to the other and an interlocking effect is achieved between adjacent wiring channels by providing mitered end edges on the channels. The channels are extruded of dual-durometer plastic composition to form a rigid body defining the wiring compartments therein with each compartment including a displaceable flexible access wall on one peripheral wall thereof and including a longitudinal slot to permit the passage of wires therebetween at any point along the longitudinal extent of any one of the wiring channels.

13 Claims, 4 Drawing Figures

PARTITION WIRING SYSTEM

This invention relates generally, to panels or partitions of the well known office furniture type which are combined with supporting posts to form an assembly serving to subdivide a large enclosure into a plurality of smaller areas, and more particularly, to the provision of an improved wiring system for such partition assemblies offering readily manipulable means for the installation and disposition of utility or service cables such as electrical wires and telephone cables.

Many efforts have been made to offer convenient means associated with movable or semi-permanently installed partition assemblies to provide for electrical raceways or wiring channels, yet many of these prior attempts require extensive modification of the partition panels and posts and/or incorporate a multitude of complicated components resulting in an expensive assembly with little or no selectivity in the manner of locating the raceways or the wiring access thereto.

By the present invention an improved arrangement is provided comprising a plurality of relatively inexpensive components, perferably of non-metallic composition, which may be quickly fitted to many existing partition assemblies without the need for any tools and by utilizing existing structure associated with many panel systems to provide the support or mounting means for the exteriorly disposed wiring channels presently proposed.

Several advantages accrue by forming the wiring channels of the present invention from a non-metallic composition, such as Vinyl plastic. First, all of the different channel components are constructed with an identical cross-section configuration and most economically may be formed by extrusion means. The naturally quiet operation of plastic members is a further advantage as is also the insulative property of these components in an electrical wiring environment.

The unique wiring channels of the instant invention perferably are produced by the well known dual-durometer extrusion process whereby in the present invention a rigid body of plastic is formed to provide a pair of adjacent isolated wiring compartments while concurrently, a portion of the peripheral wall of each compartment is formed with a wiring access wall comprising displaceable or flexible bodies of plastic. The rear of inner wall of each wiring channel is provided with integral mounting means cooperating with separate removable hanger means associated with the panel support posts, which mounting means is constructed to permit selective inverted attachment of the wiring channels thereby allowing of alternate positioning of the flexible wiring access walls of the wiring channels.

An improved flexibility is achieved by forming the distal portions of the wiring channels with mitered end edges disposed at a 45° angle with respect to the longitudinal axis of the channels such that when viewed in plan each post and panel wiring channel defines a trapezoidal configuration. In this manner a plurality of panel wiring channels and intermediate post wiring channels may be mounted upon a straight wall comprising two or more panels attached to respective posts and with each pair of longitudinally adjacent channel end edges forming a mitered joint whereupon an interlocking effect is achieved between adjacent panel and post wiring channels and a smooth substantially continuous line maintained between the mating wiring compartments of the various channels. In the foregoing related arrangement equal supplementary angles are formed by each pair of mating panel and post channel end edges however, the same panel channel end edge will be understood to form a complementary angle when disposed adjacent a corner post and juxtaposed another panel channel in a right angle partition assembly.

Accordingly, one of the objects of the present invention is to provide an improved partition wiring system including a plurality of longitudinally adjacent wiring channels removably attached to the outer face of interconnected panels and intermediate supporting posts.

A further object of the present invention is to provide an improved partition wiring system including a plurality of adjacent panel wiring channels and post wiring channels each having cooperating mitered end edges.

Still another object of the present invention is to provide an improved partition wiring system including a plurality of longitudinally adjacent wiring channels constructed of dual-durometer synthetic composition to provide a rigid body defining at least one wiring compartment therein and including at least a single flexible access wall comprising a pair of displaceable lips defining a wire access slot therebetween.

Another object of the present invention is to provide an improved partition wiring system including a plurality of panels and intermediate supporting posts provided with a hanger assembly removably attached adjacent each post and provided with hanger plates overlying the adjacent panels for the removable attachment of respective wiring channels thereto.

An additional object of the present invention is to provide an improved partition wiring system including hanger means removably attached adjacent the oppositely disposed end edges of adjacent panels and including means for the removable attachment of panel and post wiring channels thereto which channels include mounting means on the rear thereof disposed to allow upright or inverted attachment of the wiring channels to the hanger means.

With these and other objects in view, which will more readily appear as the nature of the invention is better understood, the invention consists in the novel construction, combination and arrangements of parts hereinafter more fully described, illustrated and claimed.

Similar reference characters designate corresponding parts throughout the several figures of the drawings.

Figure 1:
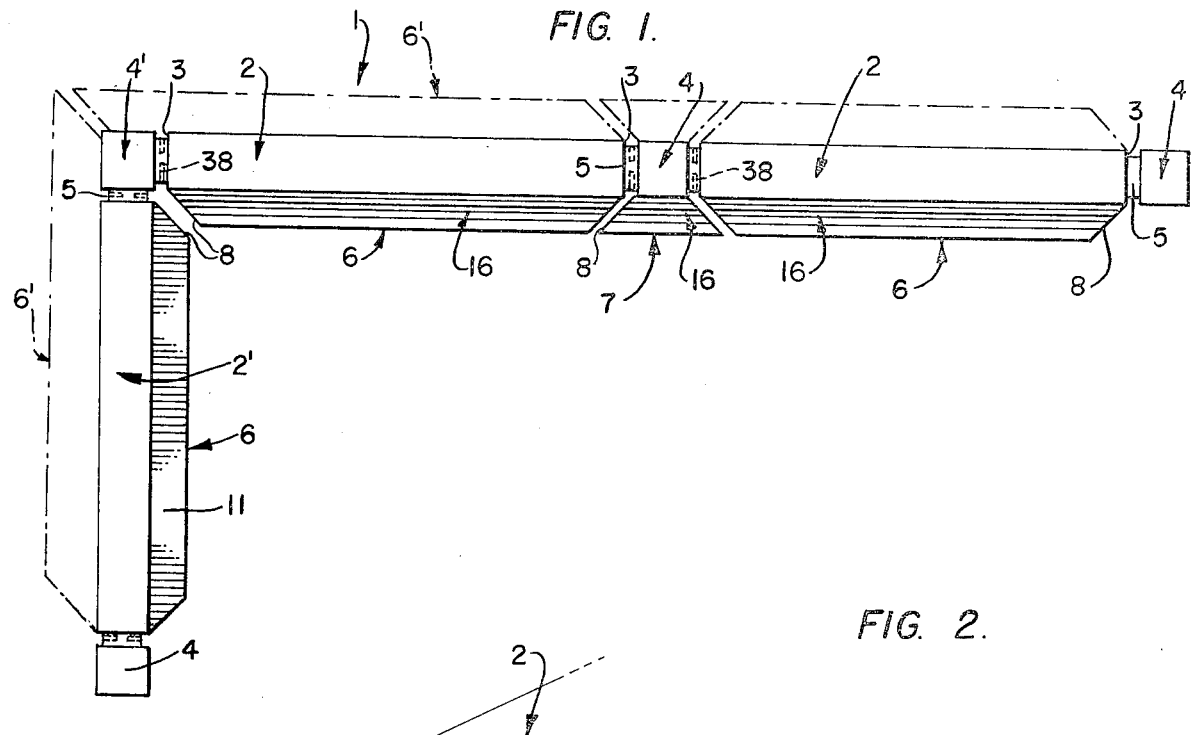
FIG. 1 is a top plan view illustrating the partition wiring system according to the present invention with wiring channels attached to the outside of the panels shown in broken lines.

Referring now to the drawings, particularly FIG. 1, the present invention will be seen to relate to a partition assembly generally designated 1 and including a plurality of panels 2 each having oppositely disposed end edges 3 attached to an upright post or standard 4 by appropriate means such as the panel edge channel member 5.

Adapted to be removably attached to either vertical face of any selected ones of the panels or posts 2 and 4 respectively, are the panel wiring channels 6 and post wiring channels 7. As will be seen in FIG. 1 the distal portions of all of the wiring channels 6 and 7 are provided with mitered end edges 8 disposed at 45° with respect to the longitudinal axis of the wiring channels such that each channel defines a trapezoidal configuration when viewed in top plan. In the case of the panel wiring channels 6, the short wall is formed by the outer surface of the channel while the post wiring channels 7 are provided with the short wall along the inside surface juxtaposed the post 4. With this arrangement the mitered end edges 8 of the two types of wiring channels define supplementary angles when the channels are attached to panels 2 and post 4 which are disposed to provide a straight wall. When an angular partition system is formed by attaching a panel 2' to a corner post 4' the same wiring channel 6 may be mounted upon the panel 2' and its mitered end edge 8 will be seen to form a complementary angle with the juxtaposed end edge 8 of the wiring channel 6 mounted upon the adjacent panel 2.

Figure 2:
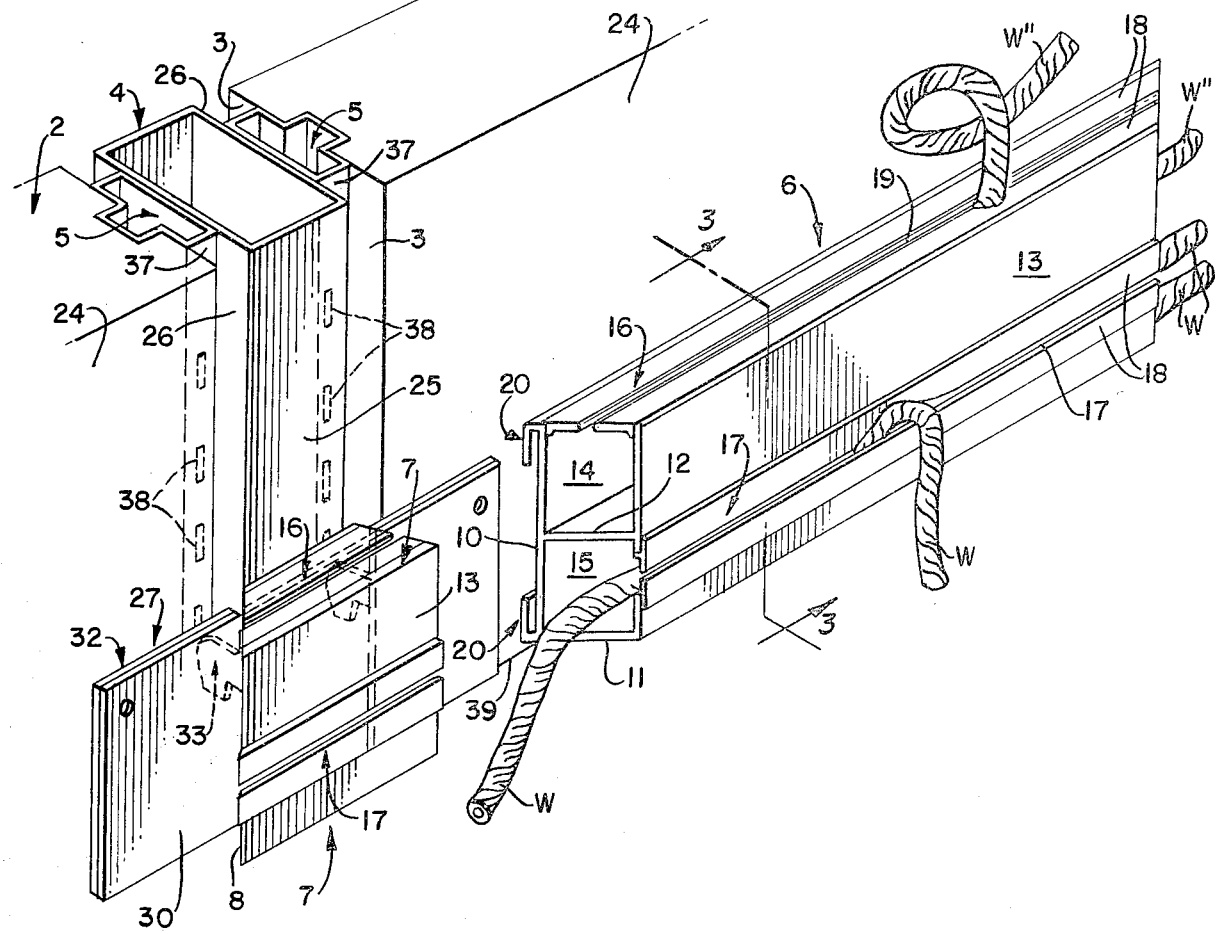
FIG. 2 is an enlarged partial perspective view illustrating the hanger assembly and means for supporting both the post and panel wiring channels therewith.
Figure 3:
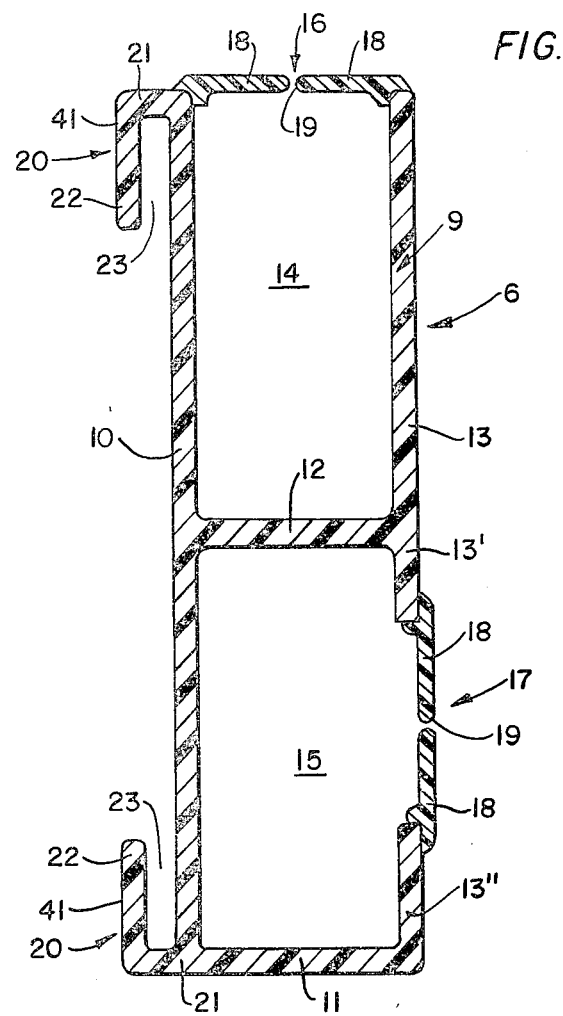
FIG. 3 is a vertical transverse sectional view of either wiring channel taken along the line 3—3 of FIG. 2.

The specific construction of the two channels 6 and 7 will be most readily apparent from a review of FIGS. 2 and 3 of the drawings. When viewed in cross-section the channels 6 and 7 are of identical construction and each will be understood to be preferably constructed from a suitable synthetic material such as Vinyl plastic. The construction of the wiring channel readily lends itself to formation by extrusion. A dual-durometer extrusion process as is well known to those skilled in the art is employed in order to simultaneously form wiring channels comprising a rigid body portion together with permanently attached flexible wall portions. The rigid body 9 comprises a rectangular configuration defining an inner or rear wall 10 extending the entire vertical height of the wiring channel and terminating at one end in the rigid end wall 11. Projecting forwardly from the medial portion of the rear wall 10 is a divider comprising a horizontal partition wall 12 to which is attached an outer or front wall 13 extending vertically in one direction at least to the end of the wiring channel.

One half of the inner wall 10 together with the adjacent partition wall 12 and the outer wall 13 will be understood to define therebetween the confines of a first wiring compartment or electrical raceway 14. The main portion of the outer wall 13 extends beyond the partition 12 a short distance to provide a distal first outer wall tab 13' and is co-planar with a second outer wall tab 13" which extends from the outer portion of the rigid end wall 11 and forms, together with one half of the inner wall 10, a second wiring compartment or electrical raceway 15.

The two wiring compartments 14-15 above described will be seen to be formed by the rigid body 9 of the wiring channel so that in the case of the first wiring compartment 14, an opening would normally be present in its end wall while in the second wiring compartment 15, an opening would normally be present in its outer or front wall between the spaced apart tabs 13' and 13". These two openings are in fact substantially enclosed by means of a flexible access end wall 16 and 17 respectively. Each of the end walls 16 and 17 are formed during the extrusion operation which produced the rigid body 9 yet the material of the two access walls is of a flexible synthetic composition such as Vinyl plastic and each will be seen to comprise a pair of free-standing lips 18—18 heat-sealed during the extrusion process to provide a permanent attachment to the adjacent portions of the rigid body 9. Experience has shown that a satisfactory durometer of the flexible lips 18 is 65-70 Shore A2. Each pair of the flexible lips 18—18 are formed to provide spaced-apart distal portions defining a minute slot 19 therebetween, preferably disposed along the medial portion of the respective end or front access wall.

The rigid body 9 of each wiring channel is provided with mounting means, generally designated 20, upon the rear or inner wall 10 and adjacent each end wall 11, of the wiring channel. This mounting means 20 includes a rearwardly projecting end wall extension 21 terminating in an inwardly and vertically directed flange 22 which flange is parallel to and spaced from the inner or rear wall 10 to provide a mounting channel or groove 23 therebetween. The two wiring channel mounting means 20—20 will be understood to be of identical configuration and mirror images of one another when viewed in end elevation as in FIG. 3 of the drawings.

The deployment of wiring through the compartments 14 and 15 will be most readily understood upon a review of FIG. 2 of the drawings wherein it will be seen that a plurality of wires may be disposed within either or both of the compartments 14 and 15. The example as shown in this figure of the drawings illustrates two wires W—W disposed within the second wiring compartment 15 and a single wire W" disposed within the first wiring compartment 14. The wiring channel 6 in this view of the drawings is disposed with the flexible access end wall 16 of the first wiring compartment 14 in the upright position thereby allowing of access to the first wiring compartment 14 at any point along the top of the wiring channel and the wire W" is shown exiting the first wiring compartment 14 at a selected point through the flexible access end wall 16 intermediate the two mitered edges 8—8 of the wiring channel. In the case of a wiring disposed in the second wiring compartment 15 it will be noted that one of the wires W is extended throughout the entire longitudinal length of the wiring compartment and exits from the opposite mitered end edge 8 of the wiring channel while the second wire W exits at a selected point through the flexible access front wall 17 intermediate the ends of the channel 6.

The flexible nature of the lips 18—18 of each access wall readily permits the insertion or removal of wiring through any point throughout the longitudinal extent of either access wall. The insertion of such wiring is achieved merely by pushing the end of a wire into the space formed by the slot 19 between the opposed flexible lips 18—18 while the removal of the end of the wire already disposed within either of the wire compartments is easily achieved by any suitable device such as a small hook tool.

With the foregoing description in mind and referring again to FIG. 1 of the drawings it will be appreciated that a plurality of wires may be inserted or removed from any one of the wiring channels 6 and 7 at any point throughout the longitudinal extent thereof and the transmission of these wires between adjacent wiring channels is greatly facilitated in view of the mitered joint formed by their respective angled end edges 8. The foregoing applies whether the various wiring channels are disposed along the inside faces of the panels and posts as shown in full lines of FIG. 1 or about the outside faces of the panels and posts as shown in broken lines in this figure of the drawings.

Alternative disposition of the flexible access end wall 16 from the arrangement shown in FIG. 2 of the drawings is possible merely by inverting the mounting of any one or all of the respective wiring channels 6 and 7, which inversion would place the end wall 16 at the bottom of the channel while the flexible access outer wall 17 would still be on the outer wall 13 of the wiring channel but at a higher elevation. This alternative disposition is illustrated in the lefthand-most channel 6 of FIG. 1 wherein the rigid end wall 11 is located uppermost, thus positioning the flexible access end wall 16 and its related first wiring compartment along the bottom of this channel. In any assembly of a plurality of wiring channels 6 and 7 it will be understood that selective ones of such wiring channels or all of them may be mounted upon the panels and posts with the flexible access end walls 16 alternatively located in the uppermost or lowermost position. Regardless of the disposition of the flexible access end wall 16 the two interior wiring compartments will still be horizontally aligned since the intermediate partition 12 is disposed along the vertical center line of the wiring channel with respect to the two wiring channel mounting means 20—20.

When it is desired to attach the wiring channels to the outside of a right angular partition system as shown in broken lines in FIG. 1 of the drawings, the two wiring channels 6'—6' adjacent the corner post 4' are formed to define a parallelogram configuration such that the same mitered joint is achieved in the area of the corner post 4' by the two adjacent wiring channels 6'.

Figure 4:
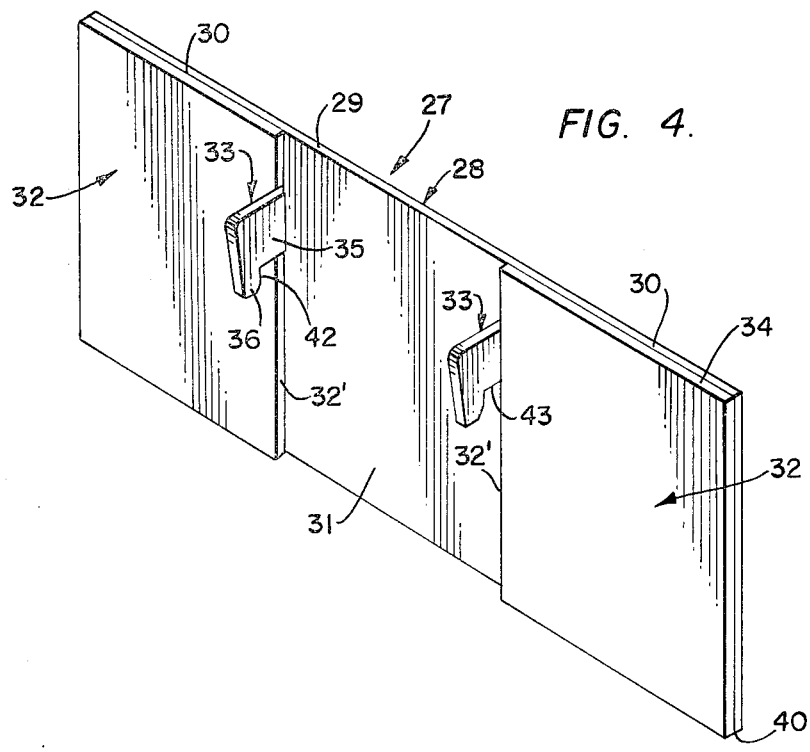
FIG. 4 is a top rear perspective view of the hanger assembly shown in FIG. 2.

The manner of attaching the above-described panel and post wiring channels 6 and 7 may now be described. The longitudinal extent of the inner or rear wall 10 of the panel channel 6 is substantially the same as the width of the panel face 24 between its two opposite end edges 3—3 while the length of the inner or rear wall 10 of the post wiring channels 7 is likewise substantially the same as the width of the post face 25 between its two opposite side walls 26—26. Attachment of both forms of the wiring channels 6 and 7 is achieved by means of a hanger assembly generally designated 27 and which is illustrated in FIGS. 2 and 4 of the drawings. The hanger assembly 27 includes a hanger plate 28 having a medial spanner section 29 of a horizontial extent substantially equal to the width of the post face 25 and which terminates on either side in a panel end section 30—30. Attached to the rear surface 31 of the hanger plate 28 are a pair of hook plates 32—32, each coextensive with the rear surface of the panel end section 30—30. A hook 33 projects rearwardly from the inner edge 32' of each hook plate 32 and is substantially disposed well below the top edge 34 of the hanger assembly 27. Each hook 33 includes a rearwardly extending neck 35 having a distal and downwardly projecting nose 36.

As previously described, the panels 2 are attached to the post or standards 4 by means of edge channel members 5. These channel members 5 include side walls 37 recessed inwardly from the plane of the coplanar panel faces 24 and post faces 25 and are provided with a plurality of vertically extending and spaced apart slots 38 therethrough. Many partition assemblies already on the market are provided with similar edge channels and slots and it is well known to utilize these slots for supporting numerous types of brackets for shelving, book cases and the like which are desired to be attached to the panel assembly. In the present invention these slots 38 serve to receive the two hooks 33—33 of each hanger assembly 27 at any selected vertical elevation with respect to the panel assembly.

Most often it will be desired to locate the present wiring system such that the lower-most end wall of the wiring channels 6 and 7 are disposed adjacent the bottom edge 39 of the panel and accordingly it will be understood that the hanger assembly hooks 33—33 will be disposed through a pair of laterally adjacent slots 38—38 located near the bottom of the post 4. The attachment of the two types of wiring channels is readily achieved without the need for any tools. The post wiring channel 7 is initially assembled by sliding either end section 30 of the hanger assembly between the inwardly directed flanges 22—22 and the rear wall 10 of the post wiring channel until the mounting means 20 of the wiring channel 7 is positioned intermediate the two hooks 33—33 and adjacent the medial spanner section 29 of the hanger assembly. Thus, it will follow that the vertical extent between the top edge 34 and the bottom edge 40 of the hanger assembly is selected to provide a close sliding fit between the bottoms of the two vertically opposed wiring channel mounting means 20—20. With the post wiring channel 7 attached to the hanger assembly 27 it is but a simple matter to insert each of the end sections 30—30 of the hanger assembly into the respective mounting means 20—20 of two adjacent panel wiring channels 6—6 and the thus-mounted three wiring channels are thereafter attached to the partition assembly merely by inserting the two hooks 33—33 of the hanger assembly into selected adjacent pairs of slots 38—38 on either side of one of the posts 4. When in this assembled position the rear surface 41 of each of the panel wiring channel mounting flanges 22 will be understood to be substantially flush with the outer face 24 of the panels. This disposition is assured by forming the hanger assembly hooks 33—33 such that when the rear edge 42 of the nose 36 thereof engages the inside of the edge channel member side wall 37, the length of the bottom edge 43 of the hook neck 35 is only of a length to accommodate thickness of the mounting means flanges 22 and the remaining distance to the rear surface of the edge channel side walls 37.

The hanger assembly 27 as shown in FIG. 4 of the drawings quite obviously would only be applicable in the case of a wiring channel 7 which was used in combination with a panel wiring channel 6 on either side thereof. In the case of the wiring channel 6 disposed adjacent a corner post 4' or adjacent the end most post 4 in a partition assembly, it will be obvious that only a hook plate 32 would be used, and the manner of attachment would be similar to that as previously described herein.

I claim:

1. A wiring system for a partition assembly including a plurality of longitudinally aligned panels provided with opposite faces and having end edges attached to adjacent intermediate supporting posts provided with opposite faces, said wiring system including, an integral hanger assembly removably attachable to said partition assembly adjacent each said post and overlying at least one said post face, at least a pair of adjacent ones of said hanger assemblies having a medial spanner section each overlying one said post face and joined to a pair of co-planar end sections respectively overlying the adjacent said panel faces, a pair of elongated panel wiring channels each having an interior longitudinal wiring compartment bounded by an inner wall overlying said adjacent panel faces and having end edges each overlying and engaging one of said end sections of said pair of adjacent hanger assemblies, said panel wiring channel end edges disposed adjacent the juncture between the respective said post and panel end edges, an elongated post wiring channel having an interior longitudinal wiring compartment bounded by an inner wall overlying and engaging each said hanger assembly medial spanner section intermediate said end sections, said post wiring channel having terminal end edges juxtaposed and defining a close axially aligned mating fit with said end edges of said two adjacent panel wiring channels, mounting means on said panel and post wiring channels adjacent said inner walls and engageable with said hanger assembly end sections and medial sections respectively, said panel and post wiring channels of similar vertical cross-sectional configuration whereby, said respective wiring compartments are horizontally aligned, a vertically slotted member adjacent the juncture of each said post and two adjacent panels, and said pair of adjacent ones of said hanger assemblies including hook means disposed intermediate said spanner section and two end sections and engageable with said slotted members to fixedly retain said hanger assemblies with each said integral hanger assembly engaged by and supporting one said post wiring channel and at least one said panel wiring channel.

2. A wiring system according to claim 1 wherein, each said wiring channel comprises a substantially rigid body having an outer wall spaced forwardly of said inner wall, an access wall bounded by said rigid body and including a pair of relatively flexible lips defining a slot therebetween whereby, wiring of a diameter greater than the width of said slot may be passed into or out of said compartment through said access wall by deflection of said flexible lips.

3. A wiring system according to claim 2 wherein, said channel rigid body and access wall lips are of dual-durometer synthetic plastic compositions.

4. A wiring system according to claim 3 wherein, the durometer of said access wall flexible lips is 65-70 Shore A2.

5. A wiring system according to claim 2 wherein, said channels are of substantially rectangular configuration in cross-section, horizontal end walls joining said inner and outer walls, and said access wall is provided in said outer wall.

6. A wiring system according to claim 5 including, a partition wall within said channels joining said inner and outer walls to define a second wiring compartment therein, and an additional access wall in one said end wall.

7. A wiring system according to claim 1 wherein, each said wiring channel includes an outer wall spaced forwardly of said inner wall, said outer wall provided with a flexible access including a pair of deflectable lips defining a slot therebetween providing communication with said wiring compartment throughout its length from one said terminal end edge to the other said terminal end edge.

8. A wiring system according to claim 1 wherein, each said channel includes an outer wall spaced forwardly of said inner wall, a partition wall within said channel joining said inner and outer walls and defining the lower limit of said wiring compartment and a second wiring compartment disposed within said channel beneath said partition wall.

9. A wiring system according to claim 8 including, end walls joining the upper and lower limits of said inner and outer walls to define channels having substantially rectangular configuration in cross-section, flexible means in one said end wall providing access within said first mentioned compartment and additional flexible means in said outer wall providing access within said second compartment.

10. A wiring system according to claim 9 wherein, said mounting means including flanges spaced rearwardly from said channel inner walls adjacent each said end wall whereby, each said channel may be selectively inverted before engaging with said hanger assemblies to provide alternate positioning of said flexible means in said walls.

11. A wiring system according to claim 1 wherein, said juxtaposed post and panel wiring channel end edges are angularly disposed relative the longitudinal axis of said channels when viewed in plan.

12. A wiring system according to claim 11 wherein, said panel and post wiring channels when viewed in plan define a trapezoidal configuration having equal-length ends.

13. A wiring system according to claim 12 wherein, said channel end edges are disposed 45° relative the longitudinal axis of said channels.

* * * * *